(12) United States Patent
Molisch et al.

(10) Patent No.: US 7,729,659 B2
(45) Date of Patent: Jun. 1, 2010

(54) METHOD FOR SIGNALING QUALITY OF RANGE ESTIMATES IN UWB DEVICES

(75) Inventors: Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1020 days.

(21) Appl. No.: 11/454,568

(22) Filed: Jun. 16, 2006

(65) Prior Publication Data

US 2007/0293153 A1    Dec. 20, 2007

(51) Int. Cl.
*H04B 7/00*    (2006.01)
(52) U.S. Cl. .................. 455/41.2; 455/3.01; 455/67.11
(58) Field of Classification Search ................ 455/3.01, 455/41.2, 67.11, 140, 456.2
See application file for complete search history.

(56) References Cited

U.S. PATENT DOCUMENTS 7,450,069 B2 *   11/2008   Heidari-Bateni et al. ..... 342/458

OTHER PUBLICATIONS

J-Y. Lee and R. A. Scholtz, "Ranging in a dense multipath environment using an UWB radio link," IEEE Trans. Select Areas in Communications, vol. 20, issue 9, pp. 1677-1683, Dec. 2002.
S. Gezici, Z. Tian, G. B. Giannakis, H. Kobayashi, A. M. Molisch, H. V Poor, Z. Sahinoglu, "Localization Via UWB Radios," IEEE Signal Pro. Magazine, v.22, n.4, pp. 70-84, Jul. 2005.
Vern Brethour, "Ranging Values," IEEE 802.15-05-0679-01-004a.

* cited by examiner

*Primary Examiner*—Tuan H Nguyen
(74) *Attorney, Agent, or Firm*—Dirk Brinkman; Gene Vinokur

(57) ABSTRACT

A method signals a quality of range estimates in a UWB network. For each range estimate, a confidence level of a range estimate is signaled, a confidence interval for the range estimate is signaled, and a confidence interval scaling factor for the confidence interval is signaled.

9 Claims, 3 Drawing Sheets

100

100

METHOD FOR SIGNALING QUALITY OF RANGE ESTIMATES IN UWB DEVICES

FIELD OF THE INVENTION

This invention relates generally to radio ranging, and more particularly to ranging with ultra wideband radio signals.

BACKGROUND OF THE INVENTION

There is a growing demand for location awareness in short range radio networks, particularly in ultra wideband (UWB) networks. Typically, the location of a node in the network is determined based radio ranging measurements.

UWB or digital pulse wireless communication is a wireless technology for transmitting large amounts of data over a wide spectrum of frequency bands with very low power and for a short distance. UWB radio signals not only can carry a huge amount of data over a short distance at very low power, e.g., less than 0.5 milliwatts, but have the ability to carry signals through doors and other obstacles that tend to reflect signals having more limited bandwidths and a higher power.

UWB signals are transmitted as digital pulses that are timed very precisely on a carrier signal across a very wide spectrum of frequencies. A transmitter and a receiver are synchronized to send and receive pulses with an accuracy of trillionths of a second. On any particular frequency, the UWB signal has less power than normal and anticipated background noise. Theoretically, interference with conventional radio signals is negligible.

UWB communication has three main types of application. In radar applications, the UWB signal penetrates nearby surfaces but is reflected by surfaces that are farther away, allowing objects to be detected behind walls or other coverings. In data transmission applications, digital pulses allow a very low powered and relatively low cost signal to carry information at very high data rates over a short range. In location awareness applications, ultra wideband digital pulses allow accurate ranging estimate between different devices.

UWB applications communicate in accordance with a protocol stack that includes a physical layer (PHY), a media access control (MAC) layer, a network layer, a transport layer, a session layer, a presentation layer, and an application layer.

UWB two-way ranging is performed by two transceivers. Conventionally, a range packet is sent from a device A to a device B. Upon receipt of the range packet at the device B, the range packet is returned to device A. Measuring the length of time required for this roundtrip can reveal the distance between the two transceivers.

For example, a transmitter can send a signal to a receiver at $t_1$. The receiver, as soon as possible, returns a reply signal to the transmitter. The transmitter measures the time of arrival (TOA) of the reply signal at time $t_2$. An estimate of the distance between the transmitter and the receiver is the time for the signal to make the round trip divided by two and multiplying by the speed of light is, i.e.:

$$D = \frac{|t_1 - t_2|}{2} c.$$

To meet the need for improved and private location awareness in UWB, an IEEE 802.15.4a Task Group (TG) has been established to develop a UWB-based physical (PHY) layer standard with a precision ranging capability. An UWB signal has a relative bandwidth larger than 20%, or an absolute bandwidth of at least 500 MHz. One type of an UWB system is an impulse radio (IR). IR uses extremely short duration pulses to generate signal waveforms, and allows fine time resolution of channel multipath characteristics, which is important in identifying the line of sight signal for precision ranging.

Various publications have described ways to accurately estimate the distance between two devices. In a paper by J-Y. Lee and R. A. Scholtz, "Ranging in a dense multipath environment using an UWB radio link," IEEE Trans. Select Areas in Communications, vol. 20, issue 9, pp. 1677-1683, Dec. 2002, the entire contents of which is incorporated by reference, a time-of-arrival (TOA)-based ranging scheme using an ultra-wideband (UWB) radio link is described. That ranging scheme implements a search process for the detection of a direct path signal in the presence of dense multipath, utilizing generalized maximum-likelihood (GML) estimation. Models for critical parameters in the process are based on statistical analysis of propagation data. The process is tested on another independent set of propagation measurements. That UWB ranging system uses a correlator and a parallel sampler with a high-speed measurement capability in the transceiver to accomplish two-way ranging in the absence of synchronized clocks. In a paper by S. Gezici, Z. Tian, G. B. Giannakis, H. Kobayashi, A. M. Molisch, H. V Poor, Z. Sahinoglu, "Localization Via UWB Radios," IEEE Signal Pro. Magazine, v. 22, n. 4, pp. 70-84, Jul. 2005, the entire contents of which is incorporated by reference, localization techniques relying on wireless ultra-wideband (UWB) signaling are described. Various localization alternatives are considered and the UWB time-of-arrival based one is found to have a highest ranging accuracy.

A further important step is to derive the position (location) of a node (device) A from the estimates of the ranges between this device A and other nodes. Using three or more such range estimates, the position (relative to the other nodes) can be determined. If the ranges are known ideally, then the position estimate also is perfect, and it does not matter whether three or more range estimates are present. Additional range estimates, e.g., more than three, just confirm the position estimate. However, in practice, the accuracy of the range estimate is always limited. In that case, a larger number of range estimates helps to decrease the error in the position estimate. Different combinations of range estimates result in different position estimates, and combining those different position estimates improves the overall accuracy. When using that technique, it is important to know the reliability of the different range estimates, and this reliability has to be communicated through the network to the nodes that make the actual position estimates.

Communicating the reliability of range estimates in an efficient way is thus important, but nontrivial. Ideally, the probability density function (pdf) of the range estimate should be communicated. However, in order to reduce the overhead, limited information can be transmitted over the network and the transmission occurs digitally. Therefore, quantization has to occur.

A conventional way for quantizing pdfs is to express the pdfs in parametric form, and communicate the suitably quantized parameters through the network. A simple example of that is a description of a Gaussian pdf, where only the mean and the variance has to be signaled. However, no parametric form of the range estimate pdf is known; it is only established that the pdf is not Gaussian. Therefore the parametric representation cannot easily be applied to ranging data.

Therefore, the current state of the art defines nominal intervals describing the accuracy of the estimate (henceforth called confidence intervals) and signals the level of confidence into each of them. For example, a proposal from Time-Domain Corporation for the IEEE 802.15.4a standard defines a 5-bit range quality indication, see Vern Brethour, "Ranging Values," IEEE 802.15-05-0679-01-004a, incorporated herein by reference. Two bits are used for a confidence interval, and three bits are used for a confidence level. The possible range resolution is very small, because only two bits are used to indicate the confidence interval.

The requirements for range accuracy can vary widely, depending on the applications. For line-of-sight situations with high transmission bandwidth, e.g., 7.5 GHz, range accuracies of less than 1 cm are desired. For other situations, e.g., non-LOS, non-coherent receivers, and distances between nodes larger than 10 meters, range accuracies of more than 1 meter are desired. Therefore, the traditional method requires the definition and signaling of a large number of ranges, which in turns requires the transmission of a large number of bits.

SUMMARY OF THE INVENTION

The embodiments of the invention provides a scaling factor so that signaled values of confidence intervals multiplied by this factor give the intended values of the confidence intervals. For example, if the nominal signaled value of the confidence interval is 1 ns and the scaling factor is 0.05, then the confidence interval becomes 0.05 ns. One scaling factor can be valid for multiple confidence intervals. The value of scaling factor can be sent for a specific link or distributed throughout the network

DETAILED DESCRIPTION OF THE PREFERRED EMBODIMENTS

Figure 3:
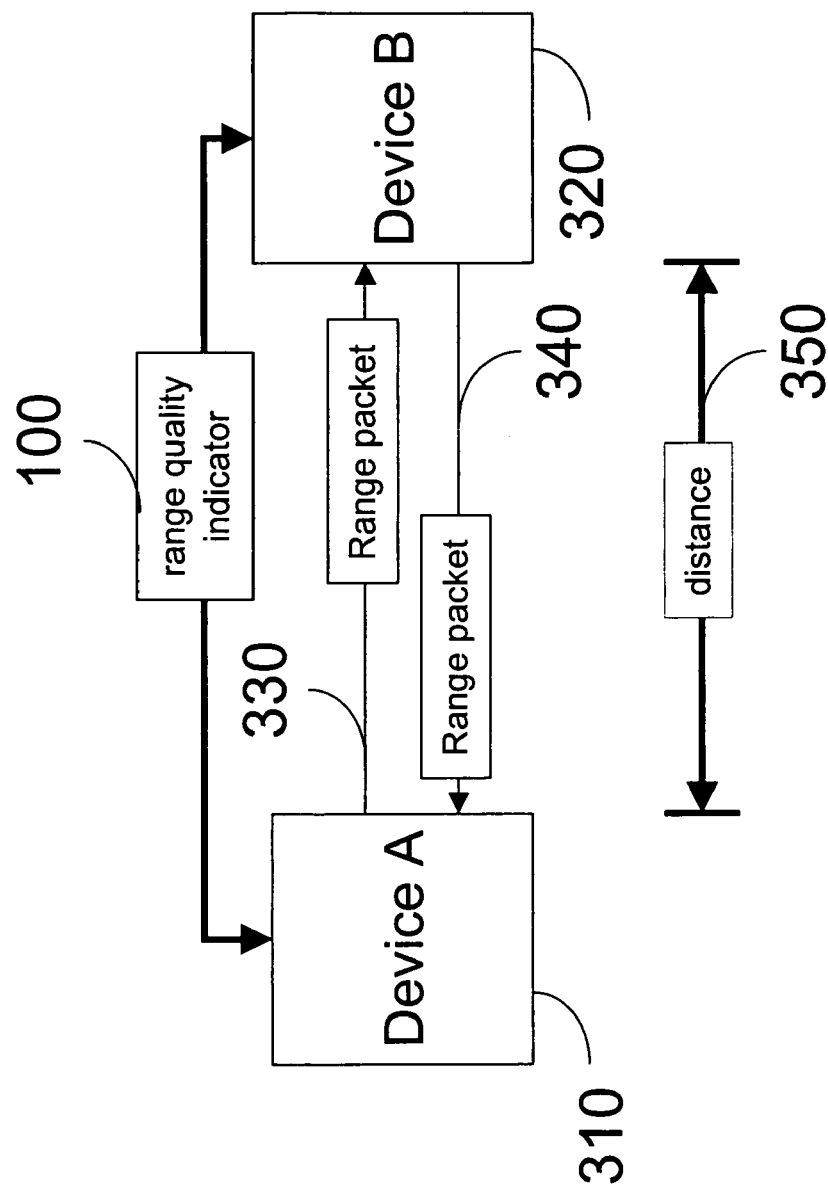
FIG. 3 is a block diagram of a network for radio ranging according to the invention.

FIG. 3 shows a wireless network for signaling ranges according to an embodiment of the invention. The network includes devices 310 and 320. The devices can be implemented as radio transceivers. In a preferred embodiment of the invention, the devices exchange ultra wideband signals (UWB). Device A 310 sends a range packet 330. In response to receiving the range packet, device B 320 responds with another range packet 340. Similarly, device B 320 can send a range packet 340 and device A 310 receives and sends another ranging packet 330. Measuring the time to send and receive the range packets reveals a distance 350 between the devices. The devices can also exchange a range quality indicator 100 indicative of the accuracy of the range estimate.

The number of required different ranges for a specific application is typically very small. If a minimum accuracy of interest is, for example, 0.1 cm, then any estimate with an error of larger than 10 cm is considered erroneous and the range estimate is discarded. On the other hand, if the minimum range of interest is 10 cm, then it is required to distinguish between a 10 cm error and a 100 cm error.

Most standards, including the IEEE 802.15.4a standard, are intended for a number of different applications. Covering all possible estimation ranges of interest would require a large number of confidence intervals.

Therefore, we first define confidence intervals, for a typical case, e.g., with a minimum accuracy of interest equal to 10 cm. Furthermore, we provide a scaling factor that is signaled with extra bits, e.g., two bits. Other sized scaling factors can also be used. This scaling factor scales the nominal value of all defined confidence intervals by the scaling factor, e.g., a scaling factor of 10. Therefore, depending on the scaling factor, which in turn can be selected depending on the application, the confidence intervals have different meanings.

Therefore, we modify the "standard approach" as described in the prior art, by adding the scaling factor.

The scaling factor can be selected according to the range quality estimate, or simply based on the application for which the wireless network is designed. In the former case, the scaling factor is selected adaptively, i.e., can change in the case of a tie, while in the latter case, the scaling factor might be set once e.g., at the factory, or by the user, or a higher signaling layer, and then remain unchanged.

Figure 1:
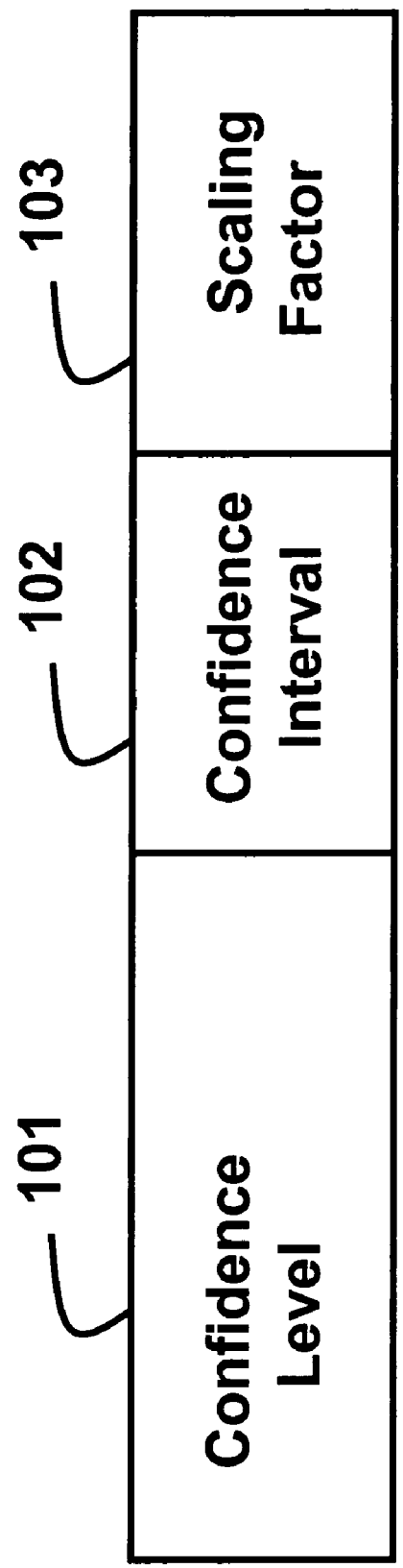
FIG. 1 is a block diagram of quality signals for radio range estimates according to an embodiment of the invention.

As shown in FIG. 1, a range quality indicator 100 for a range estimate includes the following.

A figure of merit (FoM) confidence level 101 is signaled with three bits. As an example, those three bits can represent the following confidence intervals 0%, 20%, 55%, 75%, 85%, 92%, 97%, and 99%. Of course, other values are possible as well.

A FoM confidence interval 102 is signaled with two bits. As an example, the values are 3 cm, 9 cm, 30 cm, and 90 cm.

A FoM confidence interval scaling factor 103 is signaled with two bits. As an example, the scaling factor can represent 0.5, 1, 2, and 4.

Figure 2:
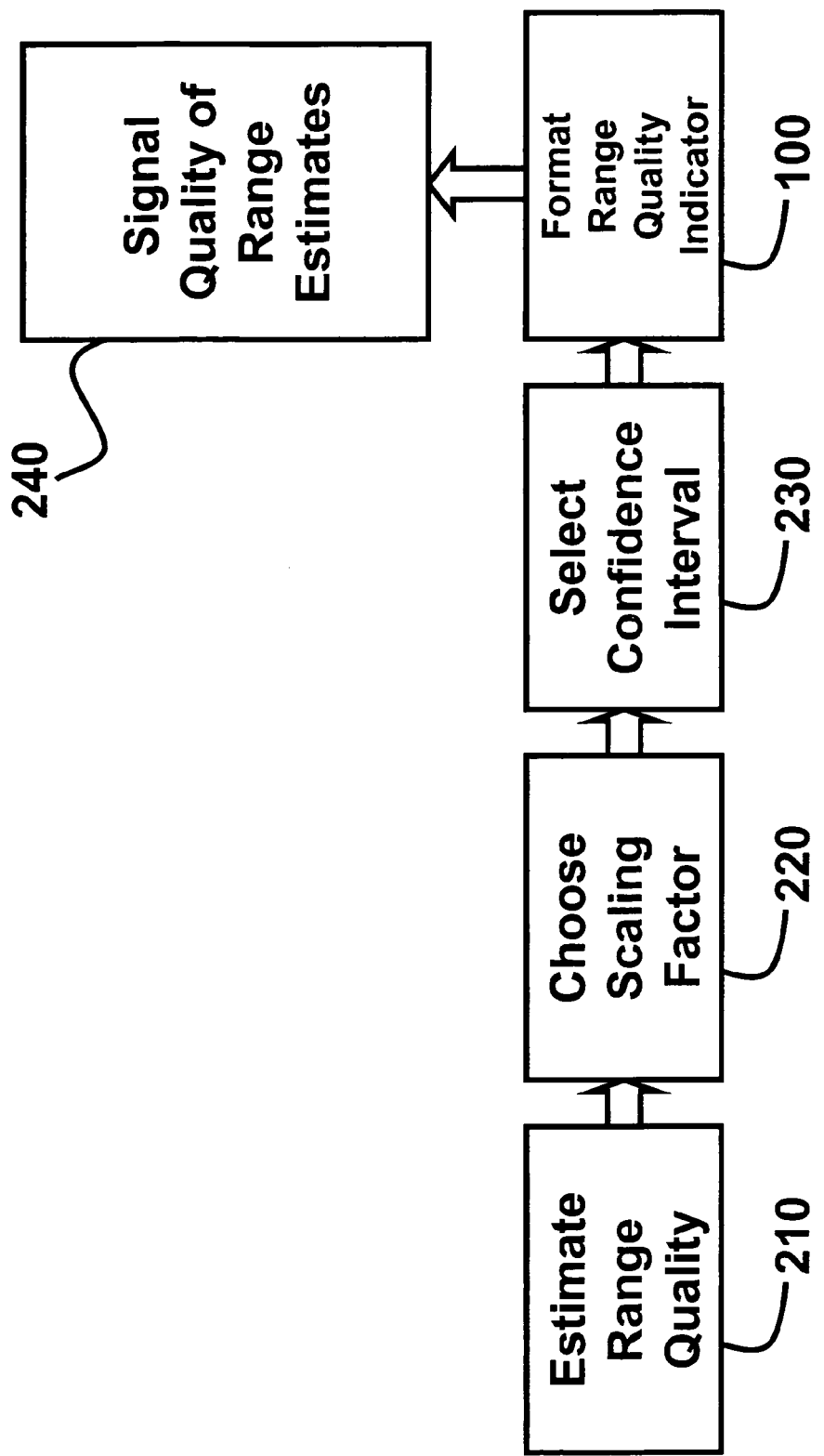
FIG. 2 is a flow diagram of a method of signaling quality of range estimates according to an embodiment of the invention.

FIG. 2 shows the general method for signaling the quality of range estimates 240, including the quality indicator 100. The range quality is estimated 210 and influences the selection of the scaling factor 220. After selecting the confidence interval 230, the range quality indicator 100 is formatted for signaling range quality estimates 240.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for signaling a range quality estimate a in a wireless network, comprising for each range estimate:

transmitting a first range packet from a first device to a second device;

transmitting a second range packet from the second device to the first device in response to receiving the first range packet by the second device;

determining the range quality estimate based on the first range packet and the second range packet; wherein the range quality estimate is indicative of an accuracy of a range estimate;

exchanging the range quality estimate between the first device and the second device, wherein the range quality estimate includes a confidence level of the range estimate, a confidence interval for the range estimate, and a confidence interval scaling factor for the confidence interval.

2. The method of claim 1, further comprising:
providing the scaling factor value over the network.

3. The method of claim 1, further comprising:
signaling the confidence level with three bits;
signaling the confidence interval with two bits; and
signaling the scaling factor with two bits.

4. The method of claim 1, in which the scaling factor scales the range confidence intervals.

5. The method of claim 1, in which the scaling factor of confidence interval depends on a particular application.

6. The method of claim 1, in which the scaling factor of the confidence interval depends on the quality of range estimates.

7. The method of claim 1, in which the network uses ultra wideband signals.

8. The method of claim 1, in which the transmitting and receiving, and exchanging is according to an IEEE 802.15.4a standard.

9. A system for signaling a range quality estimate in an ultra wideband network, comprising for each range estimate:
a first device configured to transmit a first range packet;
a second device configured to transmit a second range packet in response to receiving the first range packet;
means for determining the range quality estimate based on the first range packet and the second range packet; wherein the range quality estimate is indicative of an accuracy of a range estimate;
means for exchanging the range quality estimate between the first device and the second device, wherein the range quality estimate includes a confidence level of the range estimate, a confidence interval for the range estimate, and a confidence interval scaling factor for the confidence interval.

* * * * *